United States Patent
Kubo et al.

(10) Patent No.: US 8,902,479 B2
(45) Date of Patent: Dec. 2, 2014

(54) IMAGE PROCESSING APPARATUS AND CONTROL METHOD THEREOF

(71) Applicant: Canon Kabushiki Kaisha, Tokyo (JP)

(72) Inventors: Hideki Kubo, Kawasaki (JP); Hitoshi Fukamachi, Kawasaki (JP); Masashi Oya, Soka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/864,510

(22) Filed: Apr. 17, 2013

(65) Prior Publication Data

US 2013/0278944 A1 Oct. 24, 2013

(30) Foreign Application Priority Data

Apr. 19, 2012 (JP) ................. 2012-096093

(51) Int. Cl.
*H04N 1/04* (2006.01)
*H04N 1/405* (2006.01)

(52) U.S. Cl.
CPC ............ *H04N 1/4051* (2013.01); *H04N 1/405* (2013.01)
USPC ........... 358/474; 358/505; 358/504; 382/293; 347/102

(58) Field of Classification Search
CPC ..... H04N 13/00; H04N 17/002; H04N 1/405; H04N 1/4051; H04N 2201/04789; H04N 5/232; H04N 1/4055; H04N 2201/03162; H04N 2201/04787; H04N 19/00096; H04N 19/00218; H04N 19/00551; H04N 1/00005; H04N 19/00084; H04N 19/00315; H04N 1/60; H04N 2201/0093
USPC ............ 358/505, 2, 8, 1, 2.9, 3.03, 3.06, 2.1, 358/504; 382/252, 293, 199, 128, 283; 347/15, 14, 12, 102, 17, 39, 112
See application file for complete search history.

(56) References Cited

U.S. PATENT DOCUMENTS

| | | | | | |
|---|---|---|---|---|---|
| 5,642,439 | A | * | 6/1997 | Sato et al. | 382/254 |
| 5,734,801 | A | * | 3/1998 | Noguchi et al. | 358/1.9 |
| 5,781,709 | A | * | 7/1998 | Usami et al. | 358/1.9 |
| 5,795,082 | A | * | 8/1998 | Shimada et al. | 400/120.09 |
| 5,867,607 | A | * | 2/1999 | Shibuya et al. | 358/1.9 |
| 6,215,561 | B1 | * | 4/2001 | Kakutani | 358/1.9 |
| 6,482,591 | B2 | * | 11/2002 | Lockhart et al. | 506/15 |
| 7,009,622 | B2 | * | 3/2006 | Shiraishi | 345/606 |
| 7,289,248 | B2 | * | 10/2007 | Yamazaki | 347/19 |
| 7,457,004 | B2 | * | 11/2008 | Asai et al. | 358/3.06 |
| 7,616,340 | B2 | * | 11/2009 | Yamazaki | 358/1.8 |
| 7,623,267 | B2 | * | 11/2009 | Yamazaki | 358/3.03 |
| 8,134,742 | B2 | * | 3/2012 | Hagiwara | 358/1.9 |

FOREIGN PATENT DOCUMENTS

| | | |
|---|---|---|
| JP | 4267276 A | 9/1992 |
| JP | 2007083558 A | 4/2007 |

* cited by examiner

*Primary Examiner* — Negussie Worku
(74) *Attorney, Agent, or Firm* — Canon USA Inc. IP Division (57) ABSTRACT

An image processing apparatus configured to form an image on a recording medium using a light emitting unit including a plurality of light emitting elements includes a determination unit configured to determine a referential position of a threshold matrix corresponding to input image data based on a usage situation of each of the plurality of light emitting elements, for each processing target block, and a quantization unit configured to compare the threshold matrix determined by the determination unit with the input image data to quantize the input image data.

16 Claims, 9 Drawing Sheets

FIG. 4A
INPUT IMAGE
DATA

FIG. 4B
THRESHOLD
VALUE MATRIX

FIG. 4C
IMAGE DATA AFTER
QUANTIZATION
ELEMENT NUMBER
n  n+2
n+1 n+3

IMAGE PROCESSING APPARATUS AND CONTROL METHOD THEREOF

BACKGROUND OF THE INVENTION

1. Field of the Invention

The present invention relates to an image processing apparatus and a control method thereof for an image forming apparatus which forms an image by a light emitting unit using a plurality of light emitting elements.

2. Description of the Related Art

In the related art, an electrophotographic image forming apparatus which forms an image using a recording head including a plurality of light emitting elements such as a light emitting diode (LED) is known. The electrophotographic image forming apparatus, generally, forms an image through a plurality of processes such as charging, exposure, development, transferring, fixing, and cleaning.

Here, an image forming process in a general electrophotographic method will be described. First, a charging unit uniformly charges a photosensitive member, which is an image bearing member, and then a light emitting element, which is an exposure unit, exposes the photosensitive member according to an image signal to form an electrostatic latent image on the photosensitive member. Further, a recording head including a light emitting element is disposed to be parallel to a rotational shaft of the photosensitive member. Thereafter, a development unit develops the electrostatic latent image on the photosensitive member and forms a toner image on the photosensitive member. In this case, after the development unit charges toner, the toner is applied to the photosensitive member using a development roller rotating at a substantially constant speed, and the toner is attached onto the electrostatic latent image to form a toner image. In addition, the toner image on the photosensitive member is transferred and fixed onto a recording medium to form an image. Further, transfer residual toner remaining on the photosensitive member is collected by a cleaning unit.

In such an image forming apparatus, deterioration in an image quality such as a streak noise may occur due to deterioration of the light emitting element. Generally, a light emitting efficiency of the light emitting element such as an LED is lowered as the deterioration progresses. Therefore, if a light emitting frequency of a specific light emitting element among a plurality of light emitting elements of the recording head is high, a density of an image region formed by the corresponding light emitting element is lower than the density of an image region formed by other light emitting elements so that the image region formed by the specific light emitting element is considered as a streak noise.

Japanese Patent Application Laid-Open No. 2007-83558 discusses a method in which a lighting amount of the deteriorated light emitting element is increased more than a reference lighting amount to uniformize a variation of a light quantity of an LED head.

Further, Japanese Patent Application Laid-Open No. 4-267276 discusses a method in which input image data corresponding to a light emitting element is shifted in an arrangement direction of the light emitting element to prevent the light emitting frequency from being concentrated on a specific element.

However, according to the method discussed in Japanese Patent Application Laid-Open No. 2007-83558, the streak noise of the image may be suppressed but the deterioration of the light emitting element is sped up.

Further, according to the method discussed in Japanese Patent Application Laid-Open No. 4-267276, even though the variation of a usage amount of the light emitting element is suppressed to uniformize a light emission amount of each of the light emitting elements, the image formed position on a recording medium is deviated. In addition, when an image is formed using a plurality of colors, if the correction is independently performed for each color, registration is deviated. In the meantime, if the same correction is performed for each color, a color of which variation of a usage amount of the light emitting element cannot be suppressed may be generated.

SUMMARY OF THE INVENTION

The present invention is directed to an image processing apparatus and a control method thereof capable of suppressing the deterioration of a light emitting element without shifting an image formed position on a recording medium.

According to an aspect of the present invention, an image processing apparatus configured to form an image on a recording medium using a light emitting unit including a plurality of light emitting elements includes a determination unit configured to determine a referential position of a threshold matrix corresponding to input image data based on a usage situation of each of the plurality of light emitting elements, for each processing target block, and a quantization unit configured to compare the threshold matrix determined by the determination unit with the input image data to quantize the input image data.

According to the present invention, it is possible to suppress the deterioration of the light emitting element without shifting the image formed position on a recording medium.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Further, in an exemplary embodiment described below, a tandem type electrophotographic image forming apparatus is exemplified to describe the exemplary embodiment. This configuration is an example of the present invention, and the present invention is not limited to an illustrated configuration. For example, the present invention can be applied to a rotary color printer.

Figure 1:
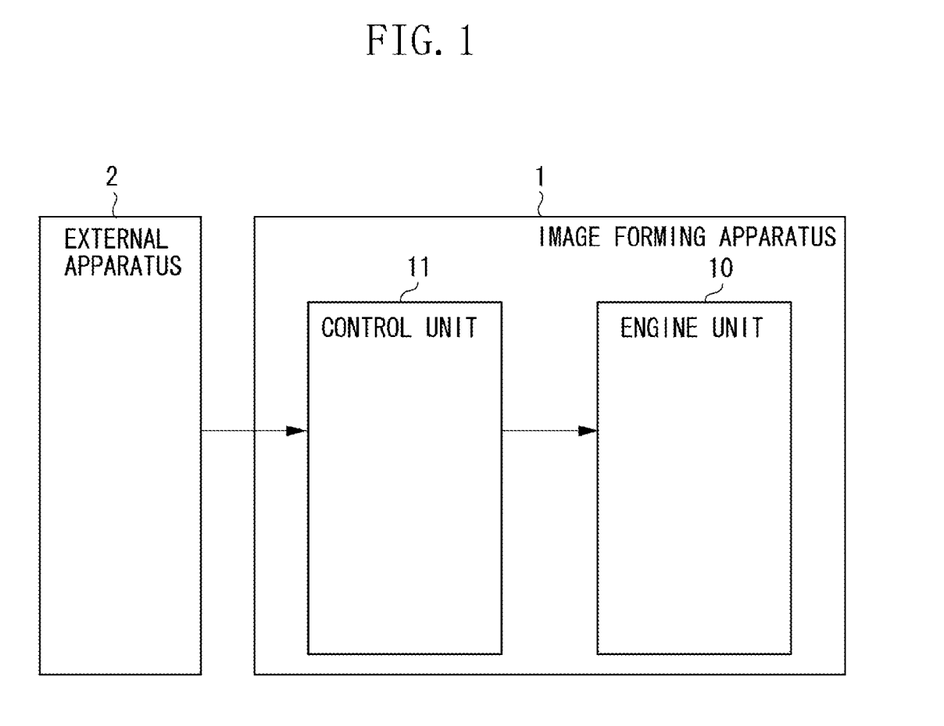
FIG. 1 is a block diagram illustrating a configuration of an image forming system.

FIG. 1 is a block diagram illustrating a configuration of an image forming system applicable to the present exemplary embodiment. The image forming system includes an image forming apparatus 1 and an external apparatus 2. Further, the image forming apparatus 1 includes a control unit 11 and an engine unit 10. The control unit 11 includes an image input unit 501 and an image processing unit 502. The engine unit 10 includes an image forming unit 503. In addition, the control unit 11 and the engine unit 10 may be provided in different devices and connected by an interface. In this case, the control unit 11 is realized as a printer driver installed in a general personal computer.

The external apparatus 2 is a host computer (PC) and outputs image data to be printed to the image forming apparatus 1. The image input unit 501 temporarily stores image data to be printed input from the external apparatus 2 and outputs the image data to the image processing unit 502. The image processing unit 502 performs image processing, such as a resolution conversion process, a gradation correction process, or a halftone processing, on the input image data and converts the image data into a format so as to be printed by the engine unit 10. Further, a halftone processing unit in the image processing unit 502 performs dither processing using a threshold matrix. Details will be described below. The image data converted by the image processing unit 502 is sent to the image forming unit 503 of the engine unit 10 to perform the printing. The image forming unit 503 performs the image forming process based on an image data signal from the image processing unit 502.

Figure 2:
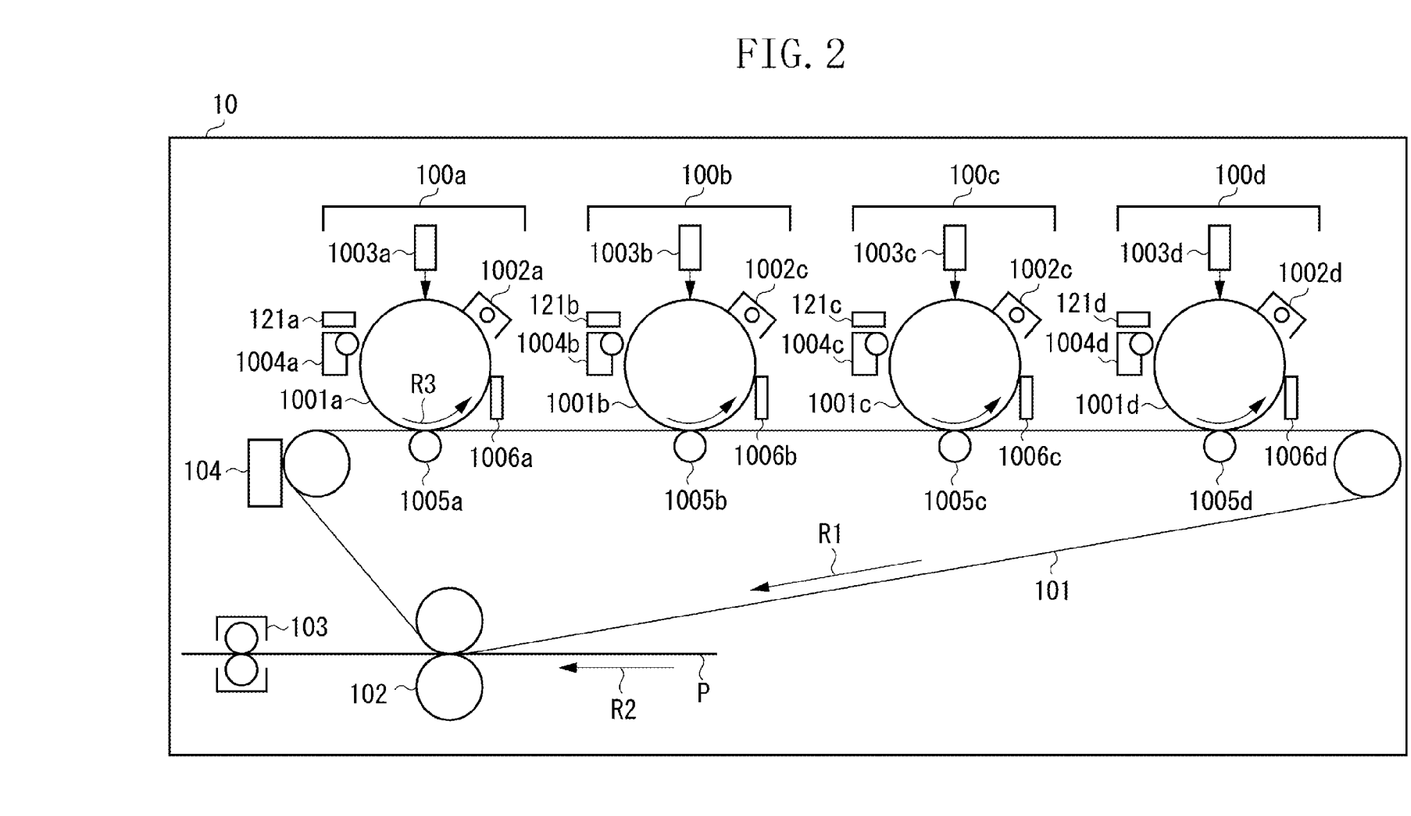
FIG. 2 is a schematic diagram illustrating a detailed configuration of the image forming apparatus.

FIG. 2 schematically illustrates a configuration of the engine unit 10. The engine unit 10 includes image forming units 100a, 100b, 100c, and 100d for CMYK colors, a secondary transfer device 102, and an intermediate transfer belt cleaning device 104 from the upstream of a rotational direction R1 of an intermediate transfer belt 101 along the intermediate transfer belt 101. Further, a fixing device 103 is disposed on a downstream side of the secondary transfer device 102. The image forming units 100a, 100b, 100c, and 100d for cyan C, magenta M, yellow Y, and black K perform the similar processing. The image forming unit 100a includes a photosensitive drum 1001a, a charging device 1002a, an exposure device 1003a, a development device 1004a, a primary transfer device 1005a, and a cleaning device 1006a. The above configuration is similar to those in the image forming units 100b, 100c, and 100d.

Hereinbelow, the image forming processing in the engine unit 10 will be described in detail.

Each of the image forming units 100a, 100b, 100c, and 100d forms a toner image on each of the photosensitive member using each of color toners and sequentially primarily transfers the toner image on the intermediate transfer belt 101. In the present exemplary embodiment, the image forming unit 100a uses C toner, the image forming unit 100b uses M toner, the image forming unit 100c uses Y toner, and the image forming unit 100d uses K toner. Further, the image forming units and used color materials are not limited to four kinds. For example, in addition to four CMYK colors, a light color toner or a clear toner may be used or less than four color toners may also be used. Further, the order of the image forming units for each color is not limited to the present exemplary embodiment, but an arbitrary order may be considered.

The toner images are formed in the order of the image forming units 100a, 100b, 100c, and 100d at predetermined different timings in parallel to each other.

First, the photosensitive drum 1001a included in the image forming unit 100a has an organic photo conductor layer having a negative charging polarity on an outer peripheral surface and rotates in a direction indicated by an arrow R3.

<Charging>

A negative polarity voltage is applied to the charging device 1002a to irradiate charged particles on a surface of the photosensitive drum 1001a to charge the surface of the photosensitive drum 1001a to have a uniform negative potential. The charged photosensitive drum 1001a rotates in a direction indicated by an arrow R3.

<Exposure>

The exposure device 1003a performs optical recording on the photosensitive drum 1001a based on a control signal obtained from the control unit 11. In this way, an electrostatic latent image is formed on the surface of the charged photosensitive drum 1001a. Further, details of the exposure device 1003 will be described below.

<Development>

The development device 1004a applies toner, which is charged to have a negative polarity, to the photosensitive drum 1001a using a development roller which rotates at a substantially constant speed. In this way, the toner is attached to the electrostatic latent image on the photosensitive drum 1001a to develop the electrostatic latent image.

<Primary Transfer>

The primary transfer device 1005a primarily transfers the toner image carried on the photosensitive drum 1001a charged with a negative polarity onto the intermediate transfer belt 101 using a transfer roller charged with a positive polarity.

<Cleaning>

The cleaning device 1006a removes remaining toner image remaining on the photosensitive drum 1001a having passed through the primary transfer device 1005a.

Until now, even though the cyan image forming unit 100a is described, the description is similar to those for the image forming units 100b, 100c, and 100d. When a color image is formed, charging, exposure, development, temporal transfer, and cleaning processes up to now sequentially proceed in the image forming units 100a, 100b, 100c, and 100d for each color. As a result, an image in which CMYK four color toner images are overlapped is formed on the intermediate transfer belt.

<Secondary Transfer>

The secondary transfer device 102 secondarily transfers the toner image carried on the intermediate transfer belt 101 onto a recording medium P moving in a direction indicated by an arrow R2.

<Fixing>

The fixing device 103 performs processing such as pressurization or heating on the recording medium P onto which the toner image is secondarily transferred to fix the image.

<Belt Cleaning>

The intermediate transfer belt cleaning device 104 removes a remaining toner remaining on the intermediate transfer belt 101 having passed through the secondary transfer device 102.

In the engine unit 10, the image is formed on the recording medium by the processes as described above.

Figure 3:
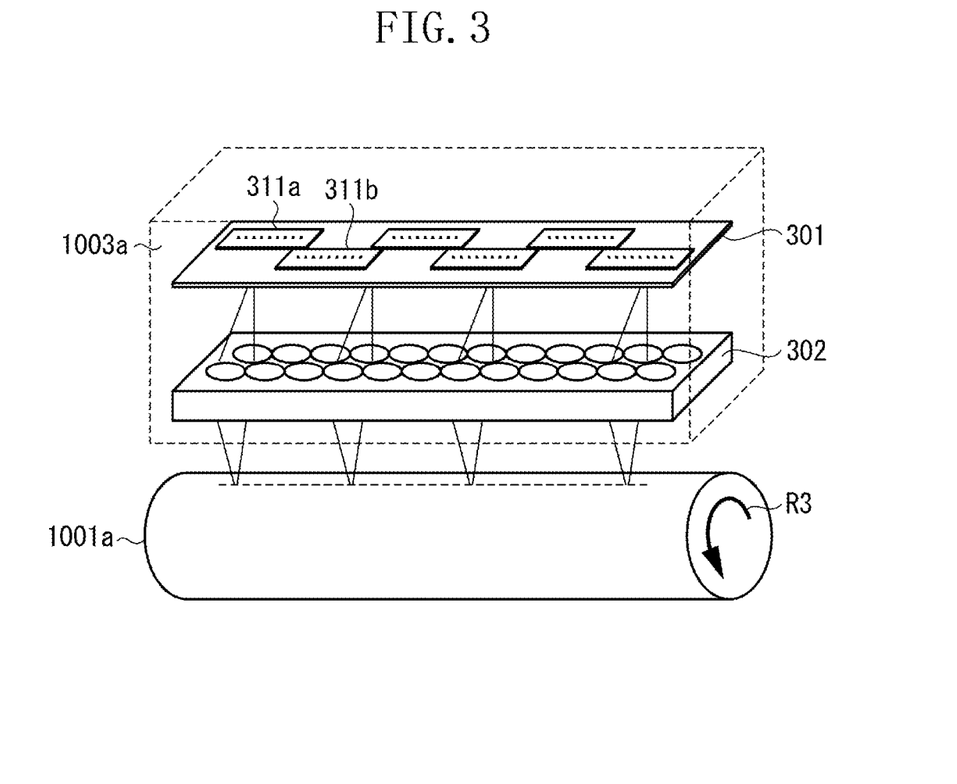
FIG. 3 is a schematic diagram illustrating a configuration of an exposure device in the image forming apparatus.

FIG. 3 is a diagram illustrating a configuration of the exposure device 1003a. In the present exemplary embodiment, the exposure device 1003a includes an LED head 301 including a plurality of LEDs as light emitting elements, a lens array 302, and a driver IC (not illustrated). On the LED head 301, a chip 311 on which the plurality of LEDs is arranged at a regular interval is disposed. The light emitting elements are arranged in an axial direction of the photosensitive drum 1001a at a predetermined pixel pitch. Further, the LED head includes a plurality of chips because it is difficult to manufacture a single chip corresponding to a width (a longitudinal direction) of the photosensitive drum. Edges of the chips have an interval at which the light emitting elements may not be disposed due to a certain reason of a substrate or an interconnection. Therefore, the plurality of chips is disposed to be shifted in a rotational direction of the photosensitive drum. At the time of exposure, the light emitting timing is controlled so as to compensate the shifted position between chips so that a desired latent image may be formed on the photosensitive drum.

The LED head 301 intermittently irradiates light onto the photosensitive drum 1001a according to a signal input from the control unit 11. The light irradiated from the LED in the LED head 301 passes through the lens array 302 arranged in a shaft direction of the photosensitive drum to form an image on the photosensitive drum 1001a. As described above, the light is irradiated on a surface of the charged photosensitive drum 1001a to form an electrostatic latent image. Further, even though an example that uses the exposure device 1003a to form an electrostatic latent image on the surface of the photosensitive drum 1001a has been described above, the exposure device performs similar operations for any other colors of the exposure device 1003b and other devices.

In the image forming apparatus which forms the electrostatic latent image on the photosensitive drum using the LED head as described above, the light emitting efficiency may be lowered according to the usage frequency of each of the light emitting elements in the LED head. Therefore, the light emission amount of the light emitting element is not uniformized so that a steak noise may occur on an output image. Accordingly, in the present exemplary embodiment, the image processing is performed using the image processing unit 502 of the control unit 11 in consideration of the usage frequency of the light emitting element.

Figure 4A:
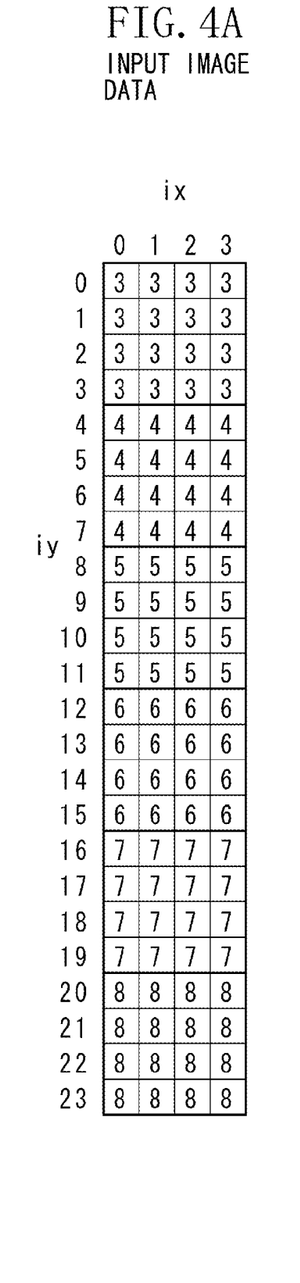
FIGS. 4A, 4B, 4C, and 4D are schematic diagrams illustrating a deviation in a usage amount for each light emitting element.
Figure 4B:
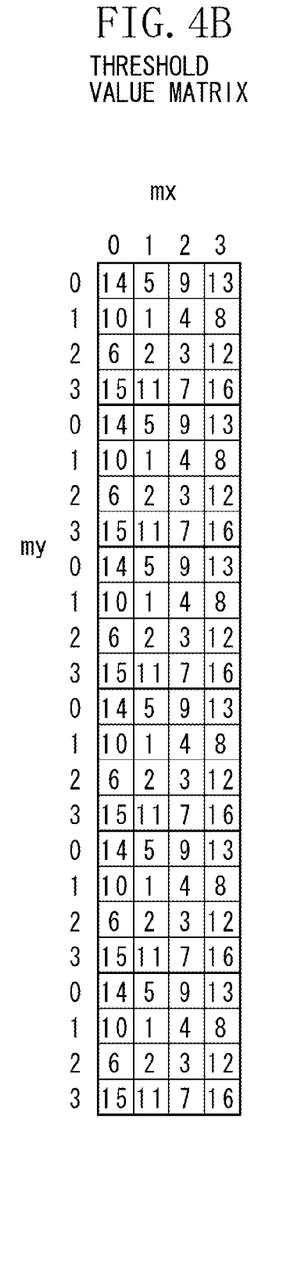

First, a variation in usage frequencies of the light emitting elements will be described. FIG. 4A illustrates an example of input image data I. Here, ix and iy indicate a coordinate of the input image and mx and my indicate a coordinate of the threshold matrix. FIG. 4B illustrates a threshold matrix M used for quantization processing performed in the image processing unit 502. Here, the threshold matrix M is formed by 4×4 and is a unit matrix, which is basically repeatedly arranged to be used. The quantization processing arranges the threshold matrixes to compare with the input image data I. Specifically, the coordinate of the threshold matrix M corresponding to the coordinate of the input image data I is determined and compared with the values stored in each coordinate. For example, a value of the coordinate (ix, iy)=(2, 15) of the input image data I is compared with a threshold value of the coordinate (mx, my)=(ix % mx_max, iy % my_max)=(2, 3) of the threshold matrix M. If a value of an input pixel that configures the input image data is larger than the threshold value, the pixel is determined as an ON dot, and if the value of the input pixel is smaller than the threshold value, the pixel is determined as an OFF dot. Further, in order to simplify the description, in FIG. 4, the input image data I has the same resolution as an output resolution of the image forming apparatus and is multi-valued data of 0 to 16. In addition, a symbol % represents a residue symbol and mx_max and my_max represent a width and a height of the unit matrix. The image data O after quantization indicates whether to turn on a corresponding LED. Such a quantization processing, which is a method widely known as an AM screen, is generally used in an electrophotographic image forming apparatus.

Figure 4C:
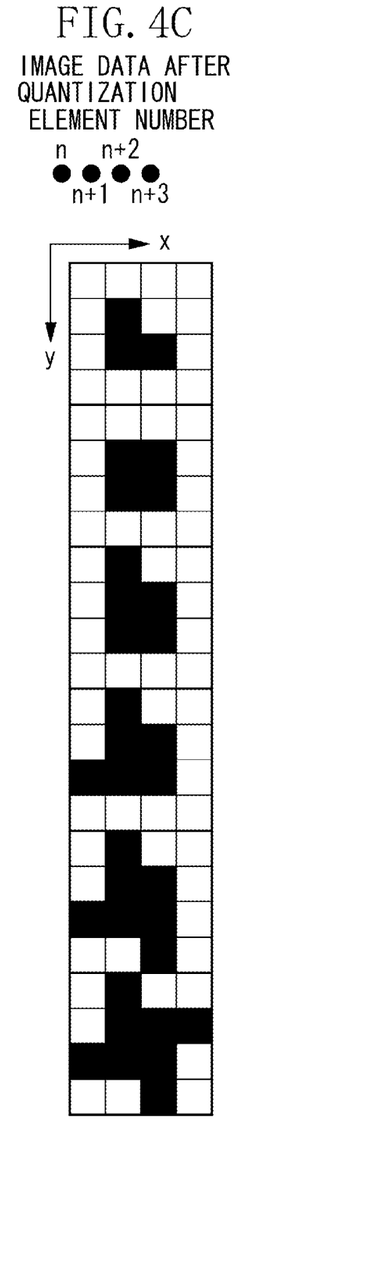
Figure 4D:
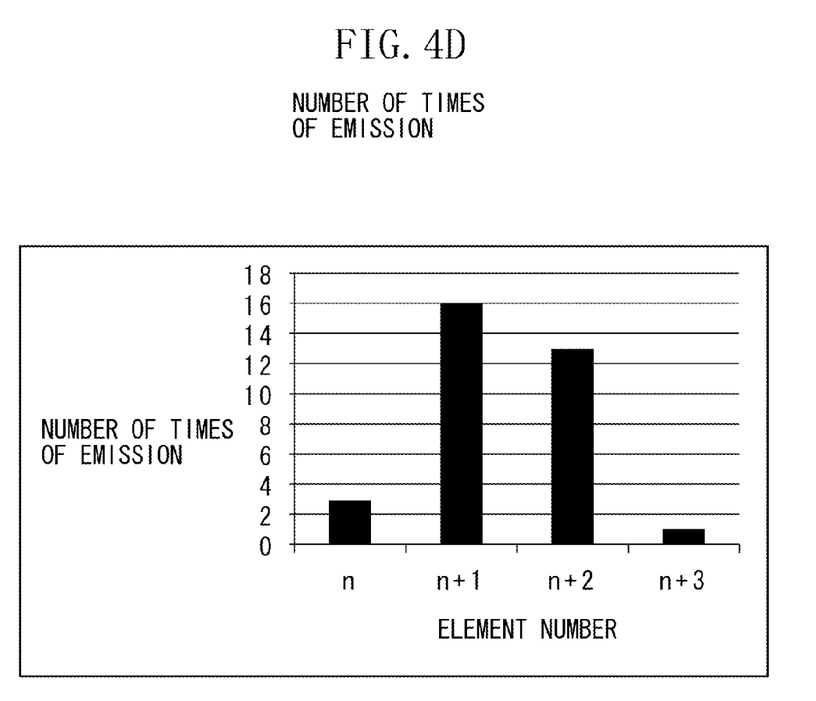

As illustrated in FIG. 4C, the arrangement of the light emitting elements corresponds to an X coordinate (a coordinate of the photosensitive drum in an axial direction) of the image data O after quantization. FIG. 4D illustrates a light emission frequency of each of the light emitting elements when outputting the image data O from four continuous light emitting elements in the LED head 301 according to the image data O after the quantization of FIG. 4C. As illustrated in FIG. 4D, in the quantization processing using the threshold matrix, the usage frequency of the light emitting element corresponding to a center of the threshold matrix is increased. A center of the threshold matrix is a position where a small threshold value is deviated and the threshold matrix M in the present exemplary embodiment is a dot centered type having a center at the center. Therefore, the usage frequencies of the light emitting elements n+1 and n+2 corresponding to the centers of the dots are increased. Therefore, if the correspondence of the pixel position of the image data and the threshold matrix is constant, a deviation in the usage frequency for each light emitting element occurs.

Therefore, the correspondence of the input image data and the threshold matrix is changed in a direction perpendicular to a scanning direction of the light emitting element so that the deviation in the usage frequency of the light emitting element is suppressed. In the image forming apparatus that uses the LED as the light emitting element in the first exemplary embodiment, each light emitting element corresponds to an X axis of the image data and scans in a y axis direction. Therefore, a phase of the center of the threshold matrix corresponds to the image data is shifted in the X axis direction.

Figure 5A:
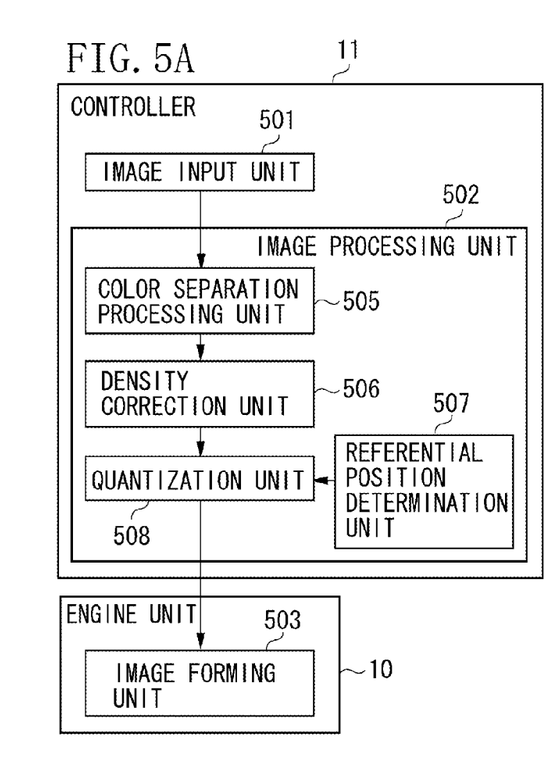
FIGS. 5A and 5B are block diagrams respectively illustrating a detailed configuration of a control unit and an engine unit of the image forming apparatus.

FIG. 5A illustrates a detailed configuration of the control unit 11 and the engine unit 10 in the image forming apparatus 1. The control unit 11 includes the image input unit 501 and the image processing unit 502. The image processing unit 502 includes a color separation processing unit 505, a density correction unit 506, a referential position determination unit 507, and a quantization unit 508. The engine unit 10 includes the image forming unit 503.

The image input unit 501 temporarily stores image data to be printed input from the external apparatus 2 and outputs the image data to the image processing unit 502.

The image processing unit 502 performs predetermined various kinds of image processing on the input image data. The color separation processing unit 505 performs color separation of the image data and converts the image data into data so as to correspond to colors of color materials of the image forming apparatus. The density correction unit corrects the image data so as to obtain a desired output density. The referential position determination unit 507 determines a referential position of the threshold matrix used by the quantization unit 508. The quantization unit 508 quantizes the image data with a corrected density according to a referential position of the threshold matrix determined by the referential position determination unit 507. An image data signal, which is converted into a format that can be output by the image forming unit 503 by the above described processing is output to the image forming unit 503 of the engine unit 10.

The image forming unit 503 of the engine unit 10 performs the image forming processing operation based on the image data signal output from the image processing unit 502.

Figure 6A:
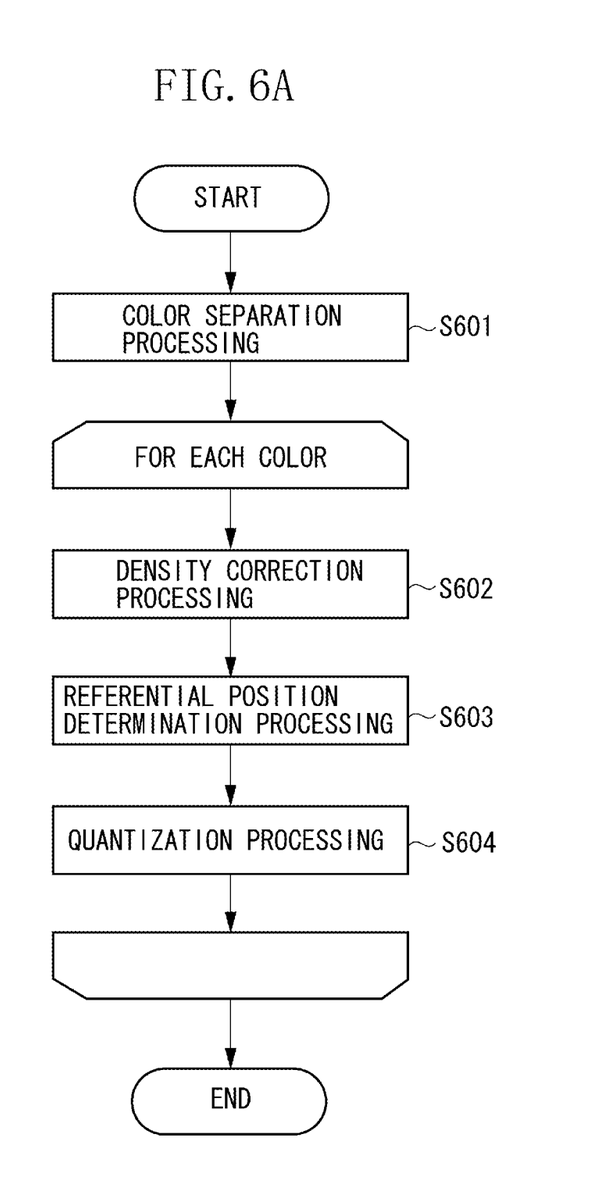
FIGS. 6A and 6B are flowcharts illustrating image processing in an image processing unit.

Hereinafter, the image processing performed by the image processing unit 502 will be described. FIG. 6A illustrates a flowchart of image processing applicable to the first exemplary embodiment. First, the color separation processing unit 505 performs color separation processing on the image data input from the image input unit 501. Here, RGB type image data is separated into image data of cyan, magenta, yellow, and black, which are colors of the color materials of the image forming apparatus. In step S601, the color separation processing refers to a predetermined color separation table. Subsequent processes are performed for each color.

Next, in step S602, the density correction unit 506 corrects a density of the image data having subjected to the color separation in step S601 with reference to a density correction table. As the density correction table, for example, a lookup table (LUT) in which the relationship (density characteristic) between a density value of the image formed on the recording medium by the image forming apparatus and a pixel value in the input image data is linear may be used. Further, in the present exemplary embodiment, after the color separation processing in step S601 and the density correction processing in step S602, even though each image data is treated as eight bit data, the conversion may be performed into other gradation steps.

Next, in step S603, the referential position determination unit 507 determines a referential position of the threshold matrix used for the quantization processing on the image data I having a corrected density corrected in step S602. The referential position determination unit 507 includes a counter i which is incremented for one page. Further, the referential position determination unit 507 resets the counter i to 0 when the incremented counter i reaches a unit matrix width mx_max of the threshold matrix to be used in step S604. Therefore, the center of the threshold matrix is shifted by one pixel in a direction perpendicular to the scanning direction of the light emitting element for one page. The counter i calculated in step S603 is used for the quantization processing in the following step S604.

Next, in step S604, the quantization unit 508 performs the quantization processing on the image data I having a corrected density corrected in step S602 using the counter i calculated in step S603. The quantization of the coordinate (ix, iy) of the image data I is performed by comparing each coordinate (ix, iy) with a value of a coordinate ((ix+i) % mx_max, iy % my_max) of the threshold matrix M. If the image data I (ix, iy)≥threshold matrix M (((ix+i) % mx_max, iy % my_max), the light emission is ON. Otherwise, the light emission is OFF to generate the image data O after quantization. The generated image data O is output to the image forming unit 503 of the engine unit 10 that forms an image on a recording medium. Further, in the present exemplary embodiment, even though it is described that the light emission in the unit of pixel is controlled with a binary value of ON/OFF, multi-valued control may be performed using a pulse width modulation (PWM) method or a pulse amplitude modulation (PAM) method.

Figure 7:
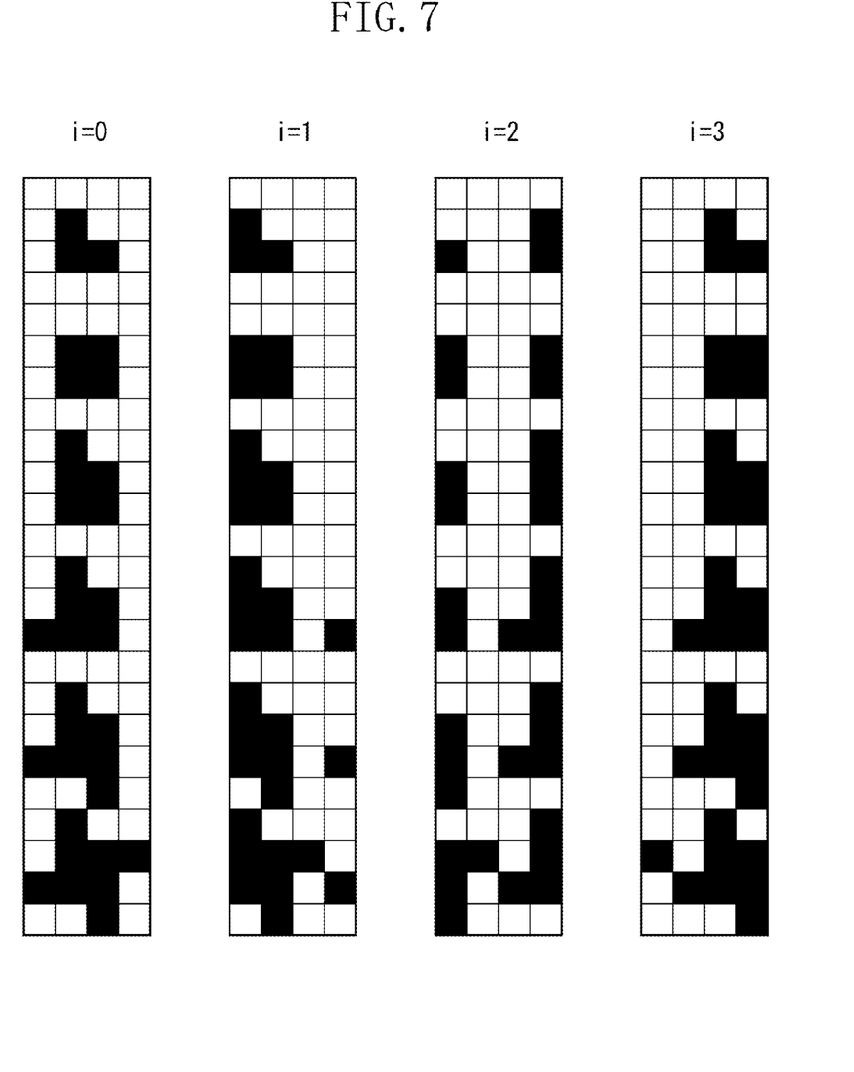
FIG. 7 is a diagram illustrating a usage amount of a light emitting element when a referential position of a threshold matrix is changed.

FIG. 7 illustrates image data after quantization when the counter i is different using the image data O after quantization and threshold matrix M illustrated in FIG. 4C as an example. According to the counter i, the position of the center of the referenced threshold matrix is changed in a direction perpendicular to the scanning direction of the light emitting element. Accordingly, the dot center in the image data O after quantization (so-called center of halftone dot) is shifted in a direction perpendicular to the scanning direction of the light emitting element. As described above, the referential position of the threshold matrix for each page to be printed is shifted in the direction perpendicular to the scanning direction of the light emitting element so that the variation in the usage frequencies of the light emitting elements may be suppressed. Further, the above-mentioned processing shifts the center of the halftone dot but does not change a position of an image having a minute structure whose contrast is high, for example, a character or fine line image.

As described above, according to the image processing method according to the present exemplary embodiment, the variation of the usage frequencies of the light emitting elements independently for each color is suppressed without shifting the image formed position on the recording medium.

Further, in the present exemplary embodiment, the counter i is increased in step S603, but it is not limited thereto. For example, even though decrement or an arbitrary change of the counter is used, it is possible to reduce the variation of the usage frequencies of the light emitting elements in the long term.

Further, in the present exemplary embodiment, even though the counter i is changed for each page in step S603, any other method may be also employed. For example, when the counter is changed based on an operation history such as a predetermined number of pages and a predetermined number of jobs, a unit time, or a power supplying timing of the image forming apparatus, the same effect may be obtained.

Further, in the present exemplary embodiment, a method that changes the counter i in step S603 and changes the position of the referenced threshold matrix has been described, but it is not limited thereto. By a method that switches the plurality of threshold matrixes whose phases of distribution of the threshold values are different, that is, distribution of the usage frequency for each X-coordinate is different, the same effect may be obtained.

Further, when the same image is continuously output, in order to obtain an exactly the same output result, a method that does not change the counter may be used.

In the first exemplary embodiment, an example that changes the referential position of the threshold matrix for each page of the recording medium on which an image is formed to suppress the variation in the usage frequencies of the light emitting elements while maintaining a position of the image on the recording medium is described. In a second exemplary embodiment, an example that stores a total usage amount of each of the light emitting elements in the apparatus to change the referential position of the threshold matrix so as to suppress the light emitting frequency of the light emitting element whose total usage amount is the largest, is described. Descriptions of the same configurations as the first exemplary embodiment will be omitted.

Figure 5B:
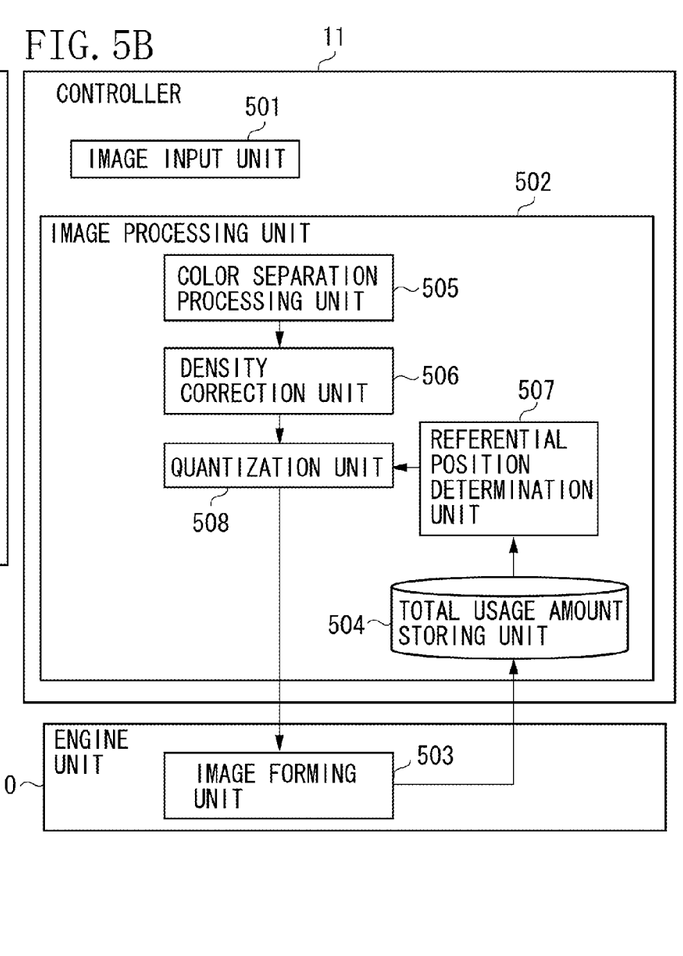

FIG. 5B illustrates a configuration of a control unit 11 that can be applied to a second exemplary embodiment. The control unit 11 in the second exemplary embodiment includes an image input unit 501, an image processing unit 502, an image forming unit 503, and a total usage amount storing unit 504. The total usage amount storing unit 504 stores a total usage amount for each light emitting element of the LED head. In the present exemplary embodiment, the total usage amount is defined as the number of pixels which is turned on for the job until now. Further, the definition of the usage amount is not limited to the above-mentioned example. It is useful if the total usage amount for each element can be obtained, and for example, a lighting time period or a light emission intensity may be used. In the second exemplary embodiment, the referential position of the threshold matrix is changed based on the usage amount of each of the light emitting elements recorded in the total usage amount storing unit 504.

Figure 6B:
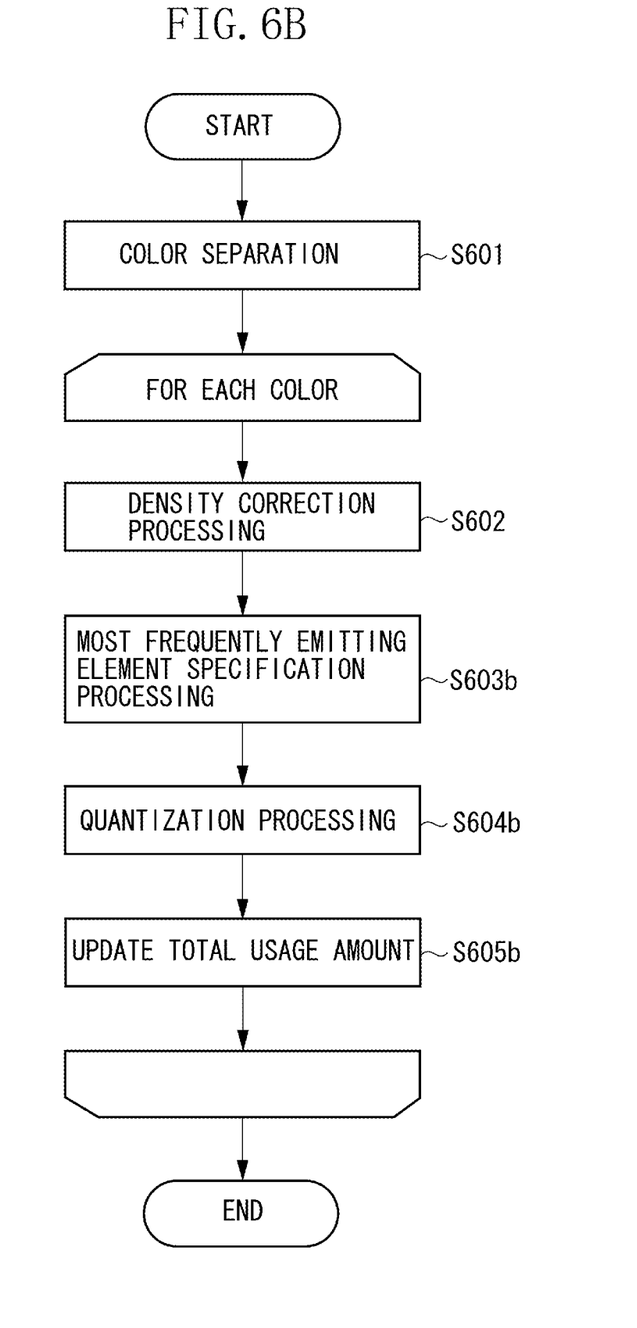

FIG. 6B is a diagram illustrating a processing flowchart of the image processing unit 502 in the second exemplary embodiment. The color separation processing in step S601 and the density correction processing in step S602 are the same as those in the first exemplary embodiment, and the description thereof will be omitted.

In step S603b, the image processing unit 502 reads out the total usage amount of each of the light emitting elements recorded in the total usage amount storing unit 504 to specify a light emitting element n_max having the largest total usage amount.

Next, in step S604b, the image processing unit 502 determines a coordinate position of the threshold matrix M which the image data I refers to based on the most frequent light emitting element n_max specified in step S603b and performs quantization processing. The image processing unit 502 has calculated in advance an X coordinate mx_low whose threshold value is the maximum in the threshold matrix to be used for the quantization, in other words, an X coordinate mx_low having the least light emitting possibility and has stored the X coordinate. In the threshold matrix M illustrated in FIG. 4B, mx=3 corresponds thereto. Here, the quantization of each coordinate (ix, iy) of the image data I is performed by comparing thereof with a value of a coordinate ((ix+(n_max % mx_max)−(mx_low−mx_max)) % mx_max, iy % my_max) of the threshold matrix M to generate the image data O after quantization. Focusing on the X coordinate of the threshold matrix to be referenced, (n_max % mx_max) indicates a phase of a most frequently lighting element among the light emitting elements corresponding to the threshold matrix. Further, (mx_low−mx_max) indicates a position of the threshold matrix having a least light emitting possibility. Accordingly, in a position where the light emitting frequency assigned to the most frequently lighting element is lowered, the threshold matrix is referred to. In other words, the threshold matrix is referred to so that the center of the threshold matrix does not correspond to the most frequently lighting element. Similar to the first exemplary embodiment, if the image data I≥threshold matrix M, the lighting is ON, otherwise, the lighting is OFF. The generated image data O after quantization is output to the image forming unit 503 of the engine unit 10.

Next, in step S605b, the image processing unit 502 updates the total usage amount of each of the light emitting elements recorded in the total usage amount storing unit 504 based on the image data O after quantization generated in step S604b.

As described above, according to the present exemplary embodiment, the light emission frequency of the light emitting element having the largest total usage amount is suppressed independently for each color without shifting image formed position on the recording medium.

Further, even though the present exemplary embodiment describes a method that suppresses the light emission frequency of the light emitting element having the largest total usage amount, a method that increases the light emission frequency of a light emitting element having the smallest total usage amount is also possible. In this case, the light emitting element n_max used in steps S603b and S604b is replaced by the light emitting element n_min having the smallest total usage amount, and the x coordinate mx_low is replaced by the x coordinate mx_high having the smallest threshold value in the threshold matrix. Thus, the method can be realized. The referential position of the threshold matrix may be determined based on the total usage amount of each of the light emitting elements and the center of the threshold matrix.

Further, even though the present exemplary embodiment describes a different method from that of the first exemplary embodiment, the methods may be switched or combined in such a manner that the processing of the first exemplary embodiment is performed until the light emitting element n_max having the largest total usage amount exceeds a predetermined value and the processing of the second exemplary embodiment is performed after the light emitting element exceeds the predetermined value.

In the exemplary embodiments described above, the image forming apparatus which uses the LED as the light emitting element has been described as an example. However, it is not limited to the image forming apparatus that uses the LED. For example, the image forming apparatus may use a multi-beam that emits a laser. In this case, each of the light emitting elements scans in the X direction of the image data, which is different from the above-described exemplary embodiments. Accordingly, the referential position of the threshold matrix may be changed to be shifted in the y axis direction in the image data. Further, for a two-dimensional surface light emitting element, the referential position of the threshold matrix may be changed so as not to cause the deviation in the usage frequency of the light emitting element.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-096093 filed Apr. 19, 2012, which is hereby incorporated by reference herein in its entirety.

What is claimed is:

1. An image processing apparatus configured to form an image on a recording medium by exposing a photosensitive member using a light emitting unit including a plurality of light emitting elements which irradiate light, the image processing apparatus comprising:
   a determination unit configured to determine a referential position of a threshold matrix corresponding to input image data based on a usage situation of each of the plurality of light emitting elements, for each processing target block, wherein the usage situation represents a degree of accumulation of light emission of each of the light emitting elements; and
   a quantization unit configured to compare the threshold matrix determined by the determination unit with the input image data to quantize the input image data.

2. The image processing apparatus according to claim 1, wherein the determination unit shifts a phase of the threshold matrix in a direction in which the light emitting elements are arranged, based on the usage situation of the plurality of light emitting elements.

3. The image processing apparatus according to claim 2, wherein the determination unit has a plurality of threshold matrixes having different phases of centers, and the determination unit selects one threshold matrix from the plurality of matrixes.

4. The image processing apparatus according to claim 1, wherein the usage situation of the plurality of light emitting elements is determined from at least one of a predetermined number of pages, a predetermined number of jobs, and a predetermined time period.

5. The image processing apparatus according to claim 1, further comprising
an acquisition unit configured to obtain a total emission amount of each of the light emitting elements,
wherein the usage situation of the plurality of light emitting elements is determined from the total emission amount.

6. The image processing apparatus according to claim 5, wherein the acquisition unit is configured to obtain a number of pixels which are turned on until now among pixels corresponding to the light emitting elements, as a total emission amount of each of the light emitting element.

7. The image processing apparatus according to claim 5, wherein the acquisition unit is configured to obtain a time period during which each of the light emitting elements has irradiated light as a total emission amount of each of the light emitting element.

8. The image processing apparatus according to claim 5, wherein the acquisition unit is configured to obtain an intensity at which each of the light emitting elements has irradiated light as a total emission amount of each of the light emitting elements.

9. The image processing apparatus according to claim 1, wherein the determination unit determines the referential position of the threshold matrix based on the position of the light emitting element having the largest total emission amount or a light emitting element having the smallest total emission amount and a phase of a center of the threshold matrix.

10. The image processing apparatus according to claim 1, wherein the threshold matrix is a dot centered type.

11. A computer-readable storage medium storing a computer-executable program that causes a computer to function as the image processing apparatus according to claim 1 when read and executed by the computer.

12. The image processing apparatus according to claim 1, wherein the light emitting elements are LEDs.

13. The image processing apparatus according to claim 1, wherein the determination unit determines the referential position of the threshold matrix by switching a plurality of threshold matrixes whose phases of distribution of the threshold values are different.

14. The image processing apparatus according to claim 1, wherein the threshold matrix includes different thresholds arranged to correspond to each of the light emitting elements.

15. An image processing method for forming an image on a recording medium by exposing a photosensitive member using a light emitting unit including a plurality of light emitting elements which irradiate light, the method comprising:
determining a referential position of a threshold matrix corresponding to input image data based on a usage situation of each of the plurality of light emitting elements, for each processing target block, wherein the usage situation represents a degree of accumulation of light emission of each of the light emitting elements; and
comparing the determined threshold matrix with the input image data to quantize the input image data.

16. The image processing apparatus according to claim 1, further comprising:
an acquisition unit configured to obtain a usage frequency of each of the light emitting elements wherein the usage frequency represents a frequency of irradiating light,
wherein the usage situation of the plurality of light emitting elements is determined from the usage frequency.

* * * * *